US007818482B2

(12) United States Patent
Shimozawa et al.

(10) Patent No.: US 7,818,482 B2
(45) Date of Patent: Oct. 19, 2010

(54) AMPLIFIER CONNECTED TO AND IDENTIFYING PLURALITY OF CONTENT REPRODUCING DEVICES WITH RESPECTIVE AUDIO SPEAKERS

(75) Inventors: Dai Shimozawa, Neyagawa (JP); Hiroyuki Fukuma, Neyagawa (JP); Kenji Handa, Kaizuka (JP)

(73) Assignee: Onkyo Corporation, Neyagawa-shi (JP)

( * ) Notice: Subject to any disclaimer, the term of this patent is extended or adjusted under 35 U.S.C. 154(b) by 1543 days.

(21) Appl. No.: 11/140,002

(22) Filed: May 27, 2005

(65) Prior Publication Data

US 2005/0281138 A1 Dec. 22, 2005

(30) Foreign Application Priority Data

Jun. 16, 2004 (JP) ............................. 2004-178070

(51) Int. Cl.
 G11B 7/085 (2006.01)
 H04N 7/18 (2006.01)
 H04N 9/475 (2006.01)

(52) U.S. Cl. .................. 710/72; 710/5; 710/8; 710/9; 710/10; 710/62; 710/64; 725/78; 725/133; 340/825.69; 340/825.79; 340/515; 340/734; 369/30.04

(58) Field of Classification Search .............. 710/5, 710/8–10, 62, 64, 72; 340/825.69, 825.72, 340/515, 734, 69, 79; 348/515, 734; 725/78, 725/133; 369/30.04
See application file for complete search history.

(56) References Cited

U.S. PATENT DOCUMENTS 6,349,352 B1 * 2/2002 Lea ............................. 710/72
6,545,587 B1 * 4/2003 Hatakeyama et al. ...... 340/3.31
6,930,730 B2 * 8/2005 Maxon et al. ............... 348/734
7,035,586 B2 * 4/2006 Finet ............................. 455/7
7,079,045 B2 * 7/2006 Baud et al. ............. 340/825.72
7,360,235 B2 * 4/2008 Davies et al. ............... 725/133
7,492,278 B2 * 2/2009 Zigmond et al. ....... 340/825.72
2002/0069417 A1 * 6/2002 Kliger et al. ................. 725/78
2006/0139489 A1 * 6/2006 Lee ............................. 348/515
2006/0210278 A1 * 9/2006 Cregg et al. ................. 398/107
2008/0201758 A1 * 8/2008 Davies et al. ............... 725/133

FOREIGN PATENT DOCUMENTS

| JP | 3-59869 | 3/1991 |
|----|---------|--------|
| JP | 4-172898 | 6/1992 |
| JP | 4-316298 | 11/1992 |
| JP | 5-128643 | 5/1993 |
| JP | 5-236366 | 9/1993 |
| JP | 7-40756 | 5/1995 |

(Continued)

*Primary Examiner*—Tammara Peyton
(74) *Attorney, Agent, or Firm*—Renner, Otto, Boisselle & Sklar, LLP

(57) ABSTRACT

An AV receiver 1 is connected to a DVD player AVP1 and a CD player AVP2 via an IEEE1394 bus. The AV receiver 1 stores a command receiving terminal 161 connected to a remote controller receiver RE1 as being associated with the DVD player AVP1, and a command receiving terminal 162 connected to a remote controller receiver RE2 as being associated with the CD player AVP2. The AV receiver 1 transmits a control command that is received via the remote controller receiver RE1 to the DVD player AVP1 and a control command that is received via the remote controller receiver RE2 to the CD player AVP2.

12 Claims, 8 Drawing Sheets

FOREIGN PATENT DOCUMENTS

| | | |
|---|---|---|
| JP | 2000-251456 | 9/2000 |
| JP | 2001-210019 | 3/2001 |
| JP | 3-093720 | 2/2003 |
| JP | 2003-45166 | 2/2003 |
| JP | 2003-297010 | 10/2003 |
| JP | 2003-339084 | 11/2003 |

* cited by examiner

AMPLIFIER CONNECTED TO AND IDENTIFYING PLURALITY OF CONTENT REPRODUCING DEVICES WITH RESPECTIVE AUDIO SPEAKERS

BACKGROUND OF THE INVENTION

1. Field of the Invention

The present invention relates to an amplifier, and more particularly to an amplifier that can be connected to a plurality of content reproducing devices.

2. Description of the Related Art

In recent years, amplifiers such as an AV amplifier and an AV receiver have come into wide use. Referring to FIG. 8, a AV receiver 100 is connected to a DVD player AVP1 and a CD player AVP2, which are content reproducing devices AVP. The AV receiver 100 is also connected to a plurality of speakers SP (SP1 and SP2). The AV receiver 100 performs a predetermined signal processing operation on an audio signal from a content reproducing device AVP, and outputs the processed signal to a speaker SP. Thus, the user can enjoy high-quality sound.

The user can operate an intended content reproducing device AVP via the AV receiver 100.

For example, where the AV receiver 100, the DVD player AVP1 and the CD player AVP2 are installed in a room Zone1, if the user in another room Zone2 wishes to operate the DVD player AVP1, the user uses a remote controller RC2 to transmit an control command to a remote controller receiver RE2. Then, the AV receiver 100 receives the control command via the remote controller receiver RE2, and transmits an control command to the DVD player AVP1 selected by the user. When the DVD player AVP1 outputs an audio signal based on the control command, the AV receiver 100 performs a signal processing operation on the audio signal, and outputs the processed signal to the speaker SP2 installed in the room Zone2. Through the operation described above, the user can operate the content reproducing devices AVP via the AV receiver 100.

With such a system, however, a plurality of users cannot simultaneously operate a plurality of content reproducing devices AVP via the AV receiver 100. For example, while a user is operating the DVD player AVP1 in the room Zone2, another user in the room Zone1 cannot operate the CD player AVP2 via the AV receiver 100.

SUMMARY OF THE INVENTION

It is therefore an object of the present invention to provide an amplifier with which a plurality of content reproducing devices can be simultaneously operated based on a plurality of user operations.

An amplifier of the present invention is an amplifier, which can be connected to a plurality of content reproducing devices, the amplifier including: a plurality of command receiving sections for receiving control commands for operating the content reproducing devices; a selected object storing section for storing a content reproducing device selected from among the plurality of content reproducing devices while associating the selected content reproducing device with a command receiving section selected from among the plurality of command receiving sections; an identification section for identifying a content reproducing device associated with a command receiving section that has received the control command, based on the selected object storing section; and a command transmitting section for transmitting the control command to the identified content reproducing device.

With the amplifier of the present invention, each content reproducing device can be associated with a different command receiving terminal. Therefore, if a command receiving terminal receives a control command while another command receiving terminal receives another control command, the amplifier can appropriately identify the content reproducing device to which each control command should be transmitted. Thus, the amplifier can simultaneously operate a plurality of content reproducing devices based on a plurality of user operations.

In a preferred embodiment, the amplifier further includes: a plug connection determination section for determining whether or not a plug connection for isochronous data transfer has been established to the identified content reproducing device; a connection determination section for, if the plug connection has not been established, determining whether or not a connection to the identified content reproducing device has been maintained; the command transmitting section transmits the control command if the plug connection has been established or if the connection to the identified content reproducing device has been maintained.

A content reproducing device may be disconnected from the amplifier after it is registered in a controlled object storing section. Thus, when the amplifier transmits a command based on the controlled object storing section, it may be possible that the content reproducing device being the controlled object is not actually connected to the amplifier. Then, the transmitted control command is an unnecessary control command. The amplifier of the present invention determines, before transmitting a command, whether or not the content reproducing device to which the command is being transmitted is actually connected to the amplifier, and transmits the command if the subject content reproducing device is connected to the amplifier. Thus, an unnecessary command will not be transmitted.

In a preferred embodiment, the amplifier can be connected to the plurality of content reproducing devices via an IEEE1394 bus, the amplifier further including: a command storing section for storing an AV/C command corresponding to the control command; a command determination section for determining whether or not the identified content reproducing device can operate based on the control command; and a search section for, if the command determination section determines that the identified content reproducing device cannot operate based on the control command, searching for the AV/C command corresponding to the control command from the command storing section, wherein if the search section finds the AV/C command, the command transmitting section transmits the AV/C command found by the search section.

If the control command received by the amplifier is a vendor unique command and if the identified content reproducing device cannot operate based on the vendor unique command, the amplifier searches for an AV/C command corresponding to the vendor unique command and transmits the found AV/C command to the identified content reproducing device. Since AV/C commands are commands that are compatible with any IEEE1394 devices, a content reproducing device can operate based on an AV/C command.

In a preferred embodiment, the amplifier further comprising a plurality of selector sections to which one or more content reproducing devices selected from among the plurality of content reproducing devices are assigned. The selected object storing section includes: an assignment storing section for storing each pair of a selector section and a content reproducing device assigned to the selector section while the selector section and the content reproducing device are associated with each other; a device location storing section for storing each pair of a command receiving section and a room accommodating a remote control command receiving section connected to the command receiving section while the command receiving section and the room are associated with each other; and a controlled object storing section for storing each pair of a selector section and a room while the selector section and the room are associated with each other.

In a preferred embodiment, the assignment storing section further stores data indicating whether or not a plug connection for isochronous data transfer is to be established.

In a preferred embodiment, the selected object storing section further includes a plug connection storing section for, if a content reproducing device has established a plug connection for isochronous data transfer, storing the content reproducing device.

A computer program of the present invention is a computer program instructing a computer to perform an operation of an amplifier, which can be connected to a plurality of content reproducing devices and which includes a plurality of command receiving sections for receiving control commands for operating the content reproducing devices. The computer program comprising: a selected object storing step of storing a content reproducing device selected from among the plurality of content reproducing devices while associating the selected content reproducing device with a command receiving section selected from among the plurality of command receiving sections; an identification step of identifying a content reproducing device associated with a command receiving section that has received the control command, based on what has been stored in the selected object storing step; and a command transmitting step of transmitting the control command to the identified content reproducing device.

In a preferred embodiment, the computer program instructs the computer to further perform: a plug connection determination step of determining whether or not a plug connection for isochronous data transfer has been established to the identified content reproducing device; and a connection determination step of, if the plug connection has not been established, determining whether or not a connection to the identified content reproducing device has been maintained. The control command is transmitted in the command transmitting step if the plug connection has been established or if the connection to the identified content reproducing device has been maintained.

In a preferred embodiment, the amplifier can be connected to the plurality of content reproducing devices via an IEEE1394 bus and further includes a command storing section for storing an AV/C command corresponding to the control command. The computer program instructs the computer to further perform: a command determination step of determining whether or not the identified content reproducing device can operate based on the control command; and a search step of, if it is determined in the command determination step that the identified content reproducing device cannot operate based on the control command, searching for the AV/C command corresponding to the control command from the command storing section. If the AV/C command is found in the search step, the AV/C command found in the search step is transmitted in the command transmitting step.

In a preferred embodiment, the amplifier further includes a plurality of selector sections to which one or more content reproducing devices selected from among the plurality of content reproducing devices are assigned. The selected object storing step includes: an assignment storing step of storing each pair of a selector section and a content reproducing device assigned to the selector section while the selector section and the content reproducing device are associated with each other; a device location storing step of storing each pair of a command receiving section and a room accommodating a remote control command receiving section connected to the command receiving section while the command receiving section and the room are associated with each other; and a controlled object storing step of storing each pair of a selector section and a room while the selector section and the room are associated with each other.

In a preferred embodiment, data indicating whether or not a plug connection for isochronous data transfer is to be established is further stored in the assignment storing step.

In a preferred embodiment, the selected object storing step further includes a plug connection storing step of, if a content reproducing device has established a plug connection for isochronous data transfer, storing the content reproducing device.

DETAILED DESCRIPTION OF THE PREFERRED EMBODIMENTS

Figure 1:
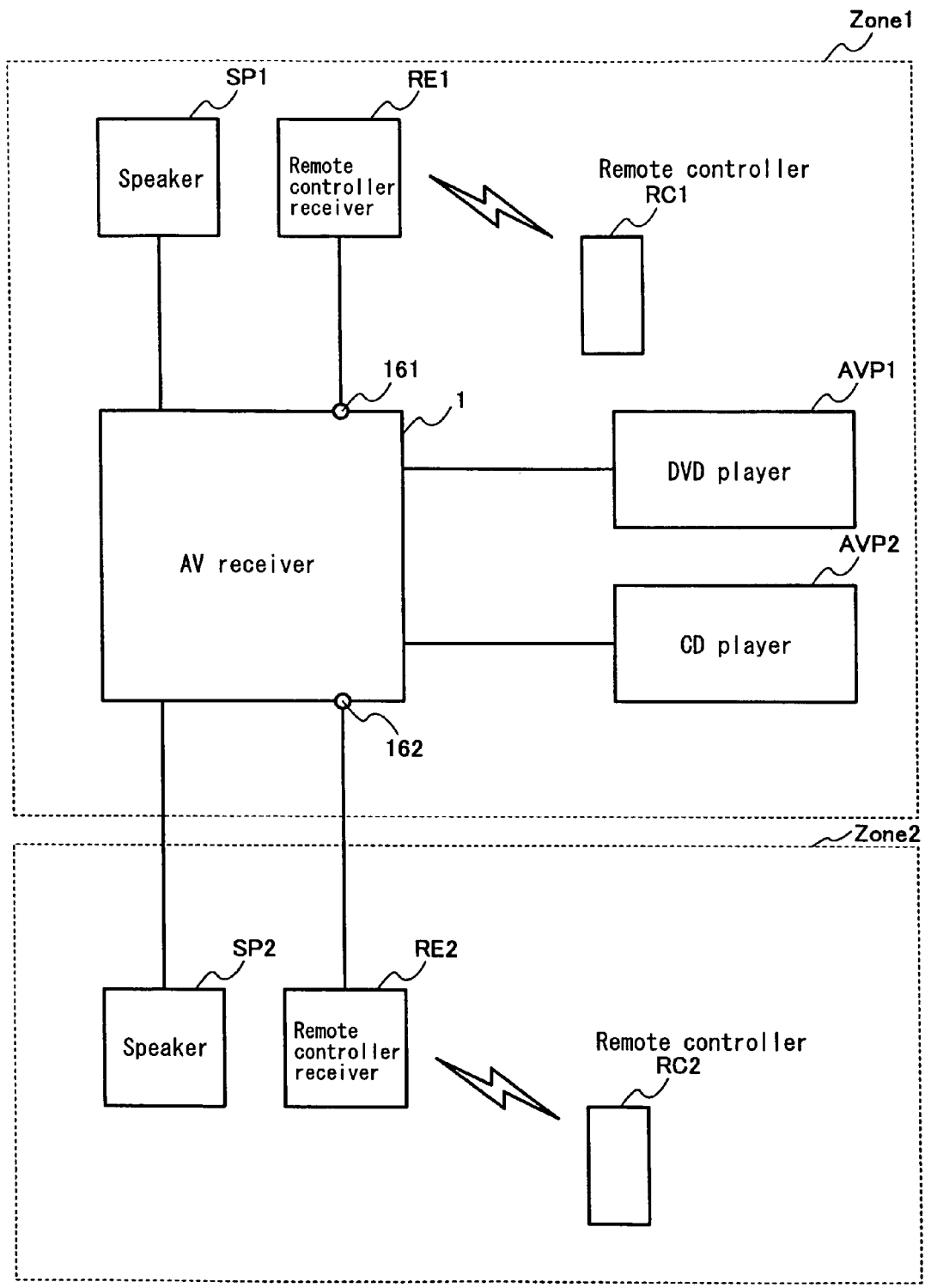
FIG. 1 is a functional block diagram showing how an AV receiver according to an embodiment of the present invention, content reproducing devices, remote controller receivers and speakers are connected to one another.

A preferred embodiment of the present invention will now be described with reference to the drawings. Like elements are denoted by like reference numerals, and will not be described repeatedly.

1. General Configuration

Referring to FIG. 1, an AV receiver 1 is connected to content reproducing devices AVP, i.e., a DVD player AVP1 and a CD player AVP2. The AV receiver 1 is also connected to a plurality of speakers SP (SP1 and SP2) and to a plurality of remote controller receivers RE (RE1 and RE2). The AV receiver 1 may be connected to more than two content reproducing devices AVP, and may be connected to more than two remote controller receivers RE and speakers SP. The remote controller receivers RE may be provided in the AV receiver 1.

In the example illustrated in FIG. 1, the AV receiver 1, the DVD player AVP1, the CD player AVP2, the remote controller receiver RE1 and the speaker SP1 are installed in a room Zone1. The remote controller receiver RE2 and the speaker SP2 are installed in a room Zone2. The room Zone1 is, for example, a living room, and the room Zone2 is, for example, a study.

Figure 2:
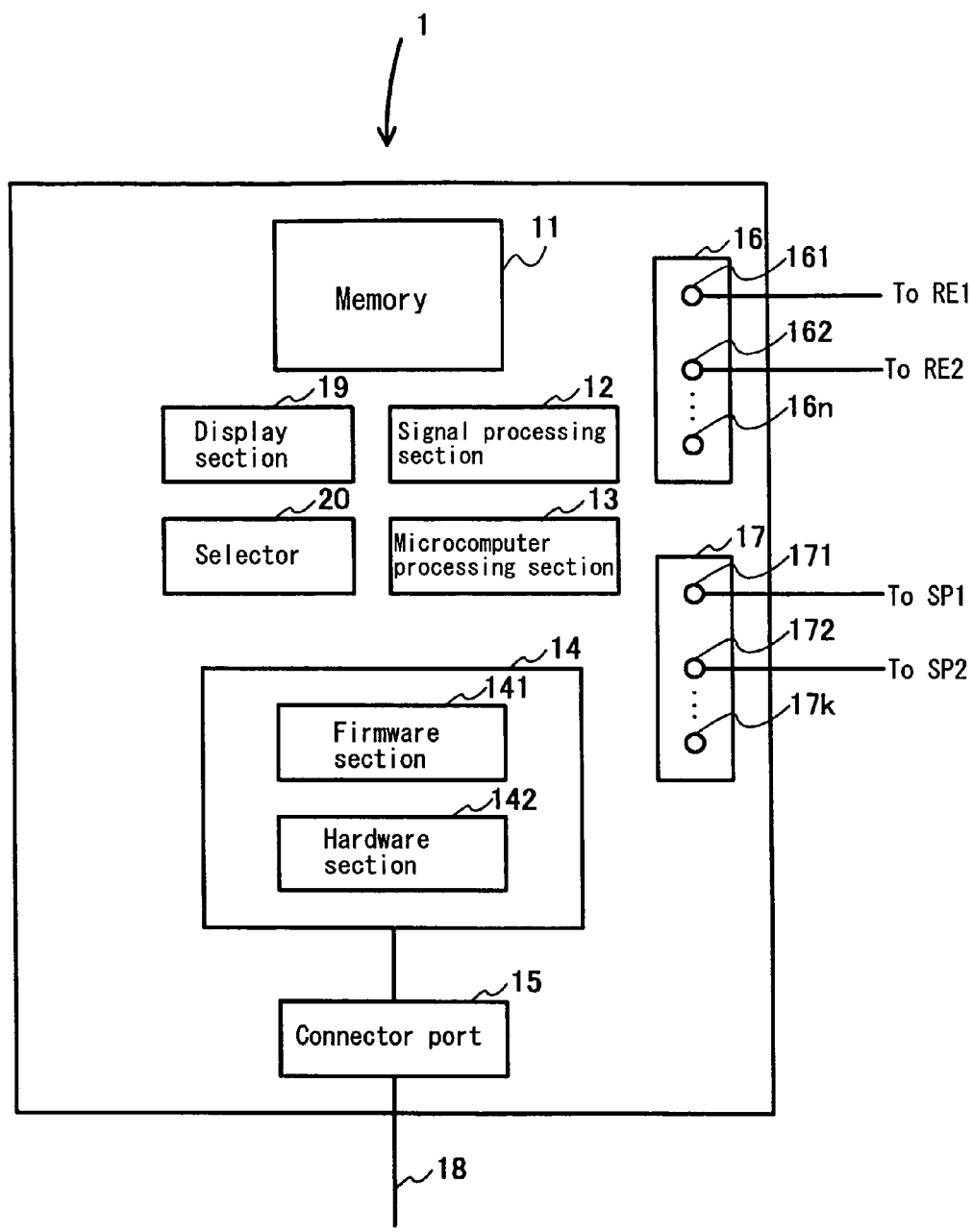
FIG. 2 is a functional block diagram showing a configuration of the AV receiver shown in FIG. 1.

Referring to FIG. 2, the AV receiver 1 includes a memory 11, a signal processing section 12, a microcomputer processing section 13, an IEEE1394 communications section 14, a connector port 15, a group of command receiving terminals 16, a group of speaker terminals 17, a display section 19 and a selector 20.

The group of command receiving terminals 16 includes a plurality of command receiving terminals 161 to 16n (n is a natural number). The remote controller receivers RE are connected to the AV receiver 1 via the command receiving terminals 161 to 16n. In the present embodiment, the remote controller receiver RE1 is connected to the AV receiver 1 via the command receiving terminal 161, and the remote controller receiver RE2 is connected to the AV receiver 1 via the command receiving terminal 162.

The group of command receiving terminals 16 receives control commands from outside for operating the DVD player AVP1 and the CD player AVP2. For example, a control command may be a reproduce command, a stop command, a fast-forward command, etc. When the user wishes to reproduce a content such as a music piece or a video image by the DVD player AVP1, the user operates a remote controller RC1 or RC2 to transmit a reproduce command from the remote controller RC1 or RC2. The group of command receiving terminals 16 receives the reproduce command via the remote controller receiver RE1 or RE2.

The group of speaker terminals 17 includes a plurality of speaker terminals 171 to 17k (k is a natural number). In the present embodiment, the speaker SP1 is connected to the AV receiver 1 via the speaker terminal 171, and the speaker SP2 is connected to the AV receiver 1 via the speaker terminal 172.

The connector port 15 is connected to a plurality of content reproducing devices AVP (the DVD player AVP1 and the CD player AVP2) via an IEEE1394 bus 18 to receive electric signals from the content reproducing devices AVP.

The IEEE1394 communications section 14 includes a firmware section 141 and a hardware section 142. The hardware section 142 includes a Link chip and a Phy chip. The Phy chip implements the physical layer of the IEEE1394 interface. The Phy chip converts an electric signal from the IEEE1394 bus 18 to a logic signal. The Phy chip also converts a logic signal from the Link chip to an electric signal. The Link chip implements the link layer of the IEEE1394 interface. The Link chip handles isochronous data transfers and asynchronous data transfers. The firmware section 141 implements the transaction layer and the serial bus management of the IEEE1394 interface.

Figure 3:
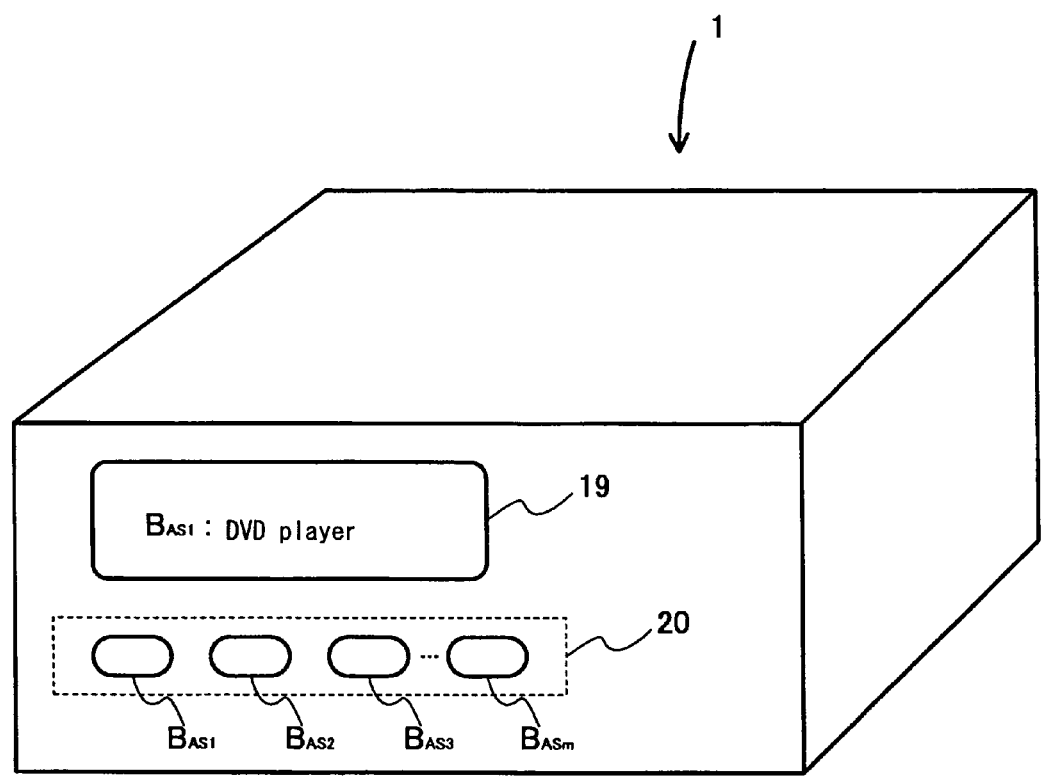
FIG. 3 is a perspective view of the AV receiver shown in FIG. 1.

The display section 19 and the selector 20 are placed on the front surface of the AV receiver 1, as shown in FIG. 3. The selector 20 includes a plurality of select buttons $B_{AS}$ ($B_{AS1}$ to $B_{ASm}$, where m is a natural number). Each select button $B_{AS}$ is assigned a content reproducing device AVP connected to the AV receiver 1. When the user wishes to operate a content reproducing device AVP via the AV receiver 1, the user selects a select button $B_{AS}$ that is assigned the content reproducing device AVP. The user can select the select button $B_{AS}$ using a remote controller RC. Information on the content reproducing device AVP assigned to the select button $B_{AS}$ is displayed on the display section 19.

Referring back to FIG. 2, the memory 11 stores a connected device table as shown in Table 1 below. Data as shown in Table 1 are not initially registered in the connected device table. Data as shown in Table 1 are registered in the connected device table through a connection operation, which will be described later.

TABLE 1

Connected Device Table

Connected Device Data $D_{AVP1}$
Connected Device Data $D_{AVP2}$
...
...

Referring to Table 1, the connected device table includes a plurality of connected device data $D_{AVP}$. The connected device data $D_{AVP}$ is data about content reproducing devices AVP connected to the AV receiver 1. In Table 1, the connected device data $D_{AVP1}$ is data about the DVD player AVP1, and the connected device data $D_{AVP2}$ is data about the CD player AVP2.

Each content reproducing device AVP has its own connected device data $D_{AVP}$. The AV receiver 1 obtains connected device data $D_{AVP}$ from content reproducing devices AVP connected to the AV receiver 1, and registers the connected device data $D_{AVP}$ in the connected device table in the order they are obtained. The connected device data $D_{AVP}$ is shown in Table 2 below.

TABLE 2

Connected Device Data $D_{AVP}$

| GUID | | Vendor Data | Model Data |
|---|---|---|---|
| Vendor ID | Chip ID | | |

The connected device data $D_{AVP}$ includes a GUID (Globally Unique IDentifier), vendor data and model data. A GUID includes a vendor ID and a chip ID. Vendor data is data about the manufacturer of the content reproducing device AVP. Model data is data about the model number of the content reproducing device AVP.

The memory 11 also stores an assignment table as shown in Table 3 below. Data about content reproducing devices AVP assigned to the select buttons $B_{AS1}$ to $B_{ASm}$ are registered in the assignment table.

TABLE 3

Assignment Table

| Assignment# | GUID | Plug Connection |
|---|---|---|
| AS1 | avp1 | 1 |
| AS2 | avp2 | 0 |
| ... | ... | ... |

Referring to Table 3, assignment numbers and GUIDs of content reproducing devices AVP associated with the assignment numbers are registered in the assignment table. Assignment#=ASm corresponds to the select button $B_{ASm}$. For example, if the user assigns the DVD player AVP1 to the select button $B_{AS1}$ and the CD player AVP2 to the select button $B_{AS2}$, the GUID of the DVD player AVP1 (=avp1) is registered in the GUID field corresponding to assignment#=AS1, and the GUID of the CD player AVP2 (=avp2) is registered in the GUID field corresponding to assignment#=AS2 as shown in Table 3.

The assignment table further includes plug connection data. A "plug connection" as used herein means a connection established between the AV receiver 1 and a content reproducing device AVP for isochronous data transfers over the IEEE1394 bus 18. If a plug connection is established when operating the DVD player AVP1, a value "1" is registered in the plug connection field corresponding to GUID=avp1. If an analog signal is output from the DVD player AVP1, a value "0" is registered in the plug connection field. Plug connection data are registered through user operations.

As with the connected device table, information as shown in Table 3 are not initially registered in the assignment table. The information are registered through user operations after a content reproducing device AVP is connected to the AV receiver 1.

The memory 11 further stores a device location table as shown in Table 4 below, and an controlled object table as shown in Table 5. Based on data registered in the device location table and the controlled object table, the AV receiver 1 associates different content reproducing devices AVP with different command receiving terminals. As a result, the AV receiver 1 can determine which content reproducing device AVP an control command received by a command receiving terminal should be sent to.

The device location table is a table used for identifying which remote controller receiver RE and which speaker SP are located in each room.

TABLE 4

Device Location Table

| ZONE | Command Receiving Terminal | Speaker Terminal |
|---|---|---|
| ZONE1 | 161 | 171 |
| ZONE2 | 162 | 172 |
| ... | ... | ... |
| ... | ... | ... |

Referring to Table 4, room IDs, command receiving terminal IDs and speaker terminal IDs are registered in the device location table. For example, the remote controller receiver RE1 and the speaker SP1 are located in the room Zone1. Therefore, the command receiving terminal 161 and the speaker terminal 171 are registered in the command receiving terminal ID field and the speaker terminal ID field, respectively, corresponding to room ID=Zone1 in the device location table. Similarly, the command receiving terminal 162 and the speaker terminal 172 are registered while being associated with Zone2. Data in the device location table are registered by the user after the remote controller receiver RE or the speaker SP is installed.

The controlled object table is a table used for identifying which content reproducing device AVP is being operated by a user in each room Zone.

TABLE 5

Controlled Object Table

| Room ID | Assignment# |
|---|---|
| Zone1 | AS1 |

For example, if a user in the room Zone1 wishes to operate the DVD player AVP1, the user operates the remote controller RC1 to select the select button $B_{AS1}$. Then, the command receiving terminal 161 receives, via the remote controller receiver RE1, an instruction to select the select button $B_{AS1}$. The AV receiver 1 refers to the device location table to determine that the room ID corresponding to the command receiving terminal 161 is Zone1. Then, the AV receiver 1 registers assignment#=AS1 in the assignment number field corresponding to room#=Zone1.

Thus, the AV receiver 1 registers command receiving terminals in the device location table and registers the selected content reproducing device in the controlled object table, thereby registering the selected content reproducing device in the memory 11 while associating the content reproducing device with a command receiving terminal.

The memory 11 further includes a plug connection table as shown in Table 6 below.

TABLE 6

Plug Connection Table

| ZONE1 | GUID |
|---|---|

The AV receiver 1 of the present embodiment can establish a plug connection with a content reproducing device AVP that is registered while being associated with room#=Zone1 in the controlled object table. The AV receiver 1 does not establish a plug connection with a content reproducing device AVP that is registered while being associated with room#=Zone2.

If the plug connection data of the content reproducing device AVP associated with room#=Zone1 in the controlled object table is "1", the GUID of the content reproducing device AVP is registered in the plug connection table as shown in Table 6.

The microcomputer processing section 13 controls the overall operation of the AV receiver 1. For example, the microcomputer processing section 13 identifies the content reproducing device AVP associated with a command receiving terminal that has received an control command, based on the controlled object table and the device location table. The microcomputer processing section 13 also performs other operations, such as determining whether or not a plug connection has been established between the AV receiver 1 and a content reproducing device AVP, and determining whether or not a content reproducing device AVP is actually connected to the IEEE 1394 bus.

The signal processing section 12 performs a predetermined signal processing operation on an audio signal output from a content reproducing device AVP. For example, the signal processing section 12 converts an isochronous data signal output from a content reproducing device AVP to an analog signal. The signal processing section 12 may also remove noise from an analog signal output from a content reproducing device AVP. The processed audio signal is output to the speakers SP1 and SP2 via the speaker terminals 171 and 172, respectively.

2. Operation

The AV receiver 1 can simultaneously operate a plurality of content reproducing devices AVP based on a plurality of user operations. The operation of the AV receiver 1 will now be described.

Figure 4:
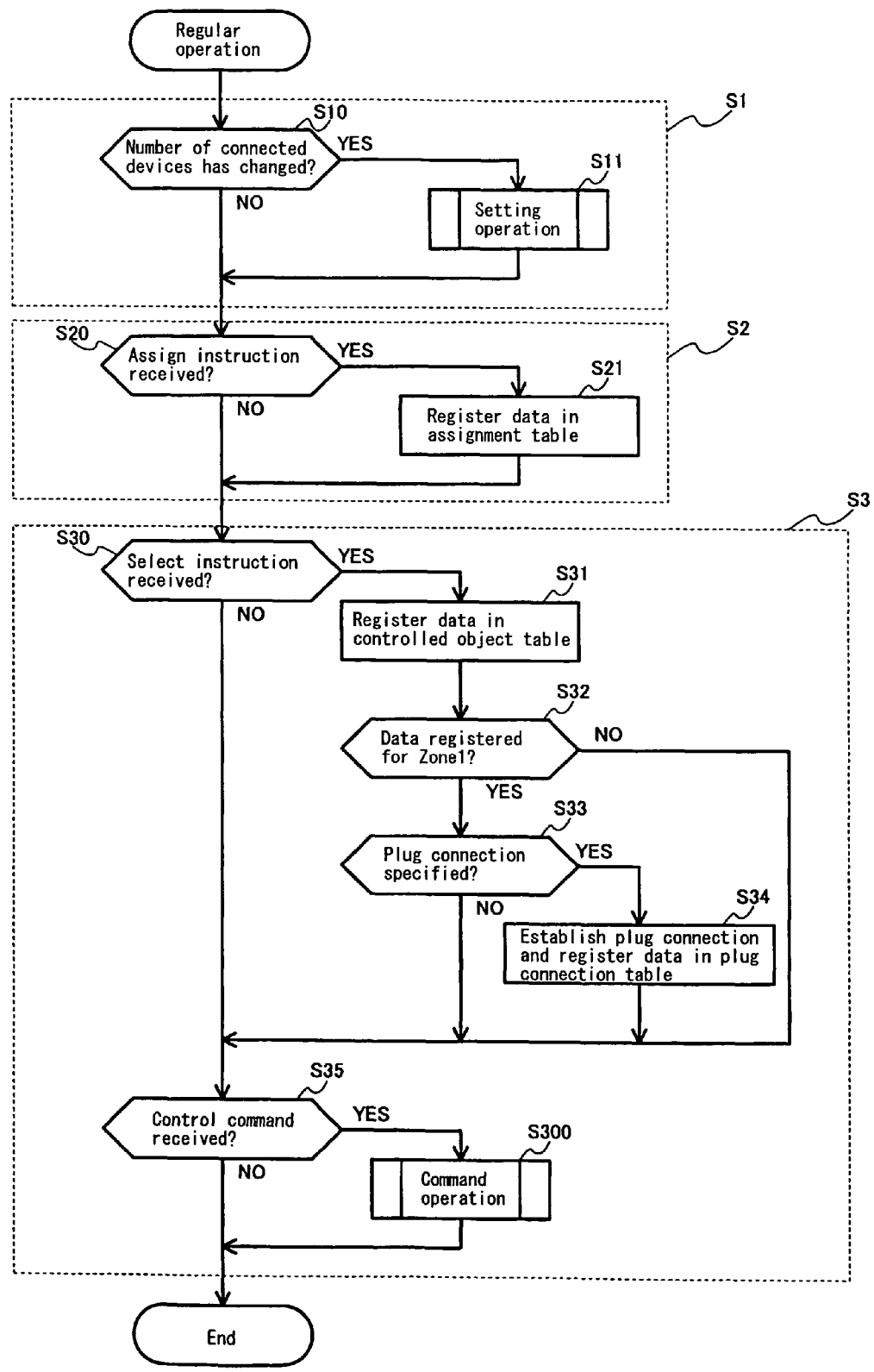
FIG. 4 is a flow chart showing an operation of the AV receiver shown in FIG. 1.

The AV receiver 1 periodically performs an operation of FIG. 4 (regular operation). Specifically, the AV receiver 1 periodically performs a connected device registration operation (S1), an assignment table registration operation (S2) and a control operation (S3).

2.1. Connected Device Registration Operation (S1)

The AV receiver 1 determines whether or not the topology of the IEEE1394 bus has been changed (S10). Specifically, the IEEE1394 communications section 14 determines whether or not the number of content reproducing devices AVP connected to the AV receiver 1 via the connector port 15 has been changed. If a content reproducing device AVP has been newly connected or disconnected, the AV receiver 1 determines that the topology of the IEEE1394 bus has been changed, and performs a setting operation (S11). The setting operation is also performed when a content reproducing device AVP is first connected to the AV receiver 1.

Figure 5:
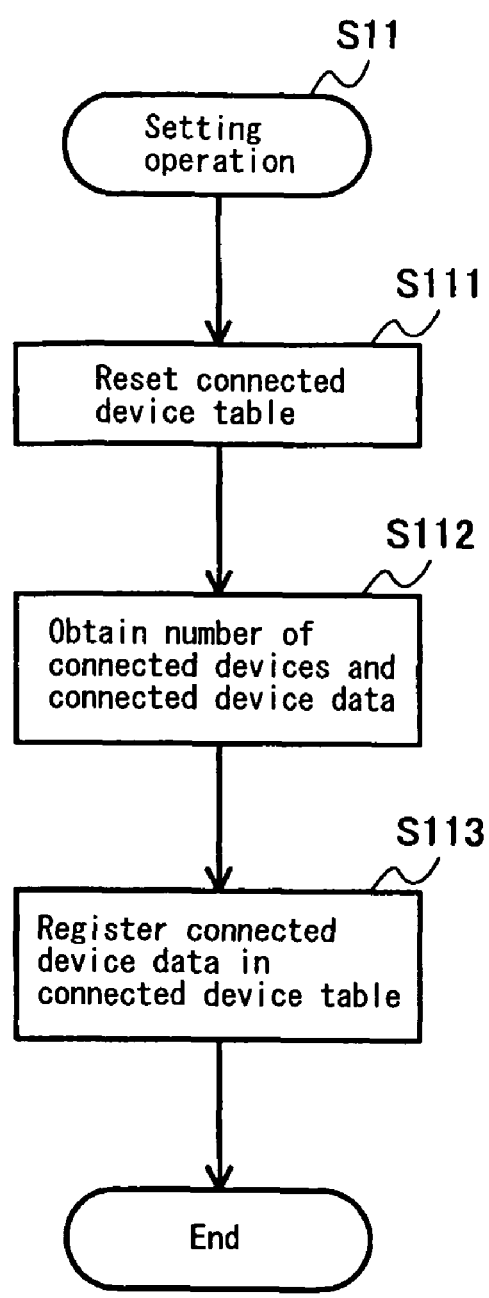
FIG. 5 is a flow chart showing in detail the operation of step S11 in FIG. 4.

Referring to FIG. 5, in the setting operation (S11), the AV receiver 1 first resets the connected device table (S111). Then, the AV receiver 1 obtains the number of content reproducing devices connected to the AV receiver 1 (the number of connected devices), and obtains the connected device data $D_{AVP1}$ and $D_{AVP2}$ from the DVD player AVP1 and the CD player AVP2 (S112). Step S112 is performed after the IEEE1394 communications section 14 performs the bus resetting operation, the tree identification operation and the self-identification operation. The obtained number of connected devices is registered in the memory 11. Moreover, the obtained connected device data $D_{AVP1}$ and $D_{AVP2}$ are registered in the connected device table (S113).

Referring back to FIG. 4, if it is determined in step S1 that the number of connected devices has not been changed, or after performing the setting operation in step S11, the AV receiver 1 performs the assignment table registration operation in step S2.

2.2. Assignment Table Registration Operation (S2)

In the assignment table registration operation, the content reproducing devices AVP connected to the AV receiver 1 are assigned to the select buttons $B_{AS}$ in the selector 20. Since the user operates the content reproducing devices AVP via the AV receiver 1, the content reproducing devices AVP need to be assigned to the select buttons $B_{AS}$.

The AV receiver 1 determines whether or not an assignment table registration instruction is received from the user (S20). A registration instruction is transmitted from the remote controller RC1 or RC2 through a user operation, for example.

If it is determined in step S20 that there is a registration instruction, the AV receiver 1 registers, in the assignment table, the content reproducing devices AVP each associated with an assignment number. Specifically, if the user assigns the DVD player AVP1 and the CD player AVP2 to the select button $B_{AS1}$ and the select button $B_{AS2}$, respectively, the GUID of the DVD player AVP1 (=avp1) is registered in the assignment table as the GUID corresponding to assignment#=AS1 as shown in Table 3. Similarly, the GUID of the CD player AVP2 (=avp2) is registered as the GUID corresponding to assignment#=AS2.

Moreover, the user selects whether an output signal of each content reproducing device AVP assigned to a select button $B_{AS}$ is an isochronous data signal or an analog signal. If the user wishes that the DVD player AVP1 outputs an isochronous data signal and the CD player AVP2 outputs an analog signal, a value "1" is registered in the plug connection field corresponding to AS1 in the assignment table and a value "0" in the plug connection field corresponding to AS2 as shown in Table 3.

After data are registered in the assignment table, the AV receiver 1 operates an intended content reproducing device AVP based on a user operation (control operation: S3).

2.3. Control Operation (S3)

2.3.1. Control Operation Based on Operation by user in Room Zone1

2.3.1.1. Where Plug Connection is Specified for Content Reproducing Device being Controlled Object If the user in the room Zone1 wishes to operate the DVD player AVP1 via the AV receiver 1, the user selects the select button $B_{AS1}$ (i.e., assignment#=AS1) using the remote controller RC1. In other words, the remote controller RC1 outputs a command specifying assignment#=AS1 as the controlled object (controlled object identification command).

The command receiving terminal 161 of the AV receiver 1 receives the controlled object identification command via the remote controller receiver RE1 (S30). Then, the AV receiver 1 registers "AS1" in the assignment number field corresponding to Zone1 in the controlled object table (S31).

Since data is registered in the assignment number field corresponding to Zone1 (S32), the AV receiver 1 further determines whether or not a plug connection is specified for the DVD player AVP1 being selected (S33). The AV receiver 1 refers to the plug connection field corresponding to AS1 in the assignment table. Since the value of the plug connection field corresponding to AS1 is "1", the AV receiver 1 establishes a plug connection with the DVD player AVP1 (S34). In this process, GUID=avp1 is registered in the plug connection table.

If the user in the room Zone1 wishes to reproduce a music piece on the DVD player AVP1, the user uses the remote controller RC1 to transmit a reproduce command to the remote controller receiver RE1.

The command receiving terminal 161 of the AV receiver 1 receives the reproduce command via the remote controller receiver RE1 (S35). Then, the AV receiver 1 performs a command operation (S300).

Figure 6:
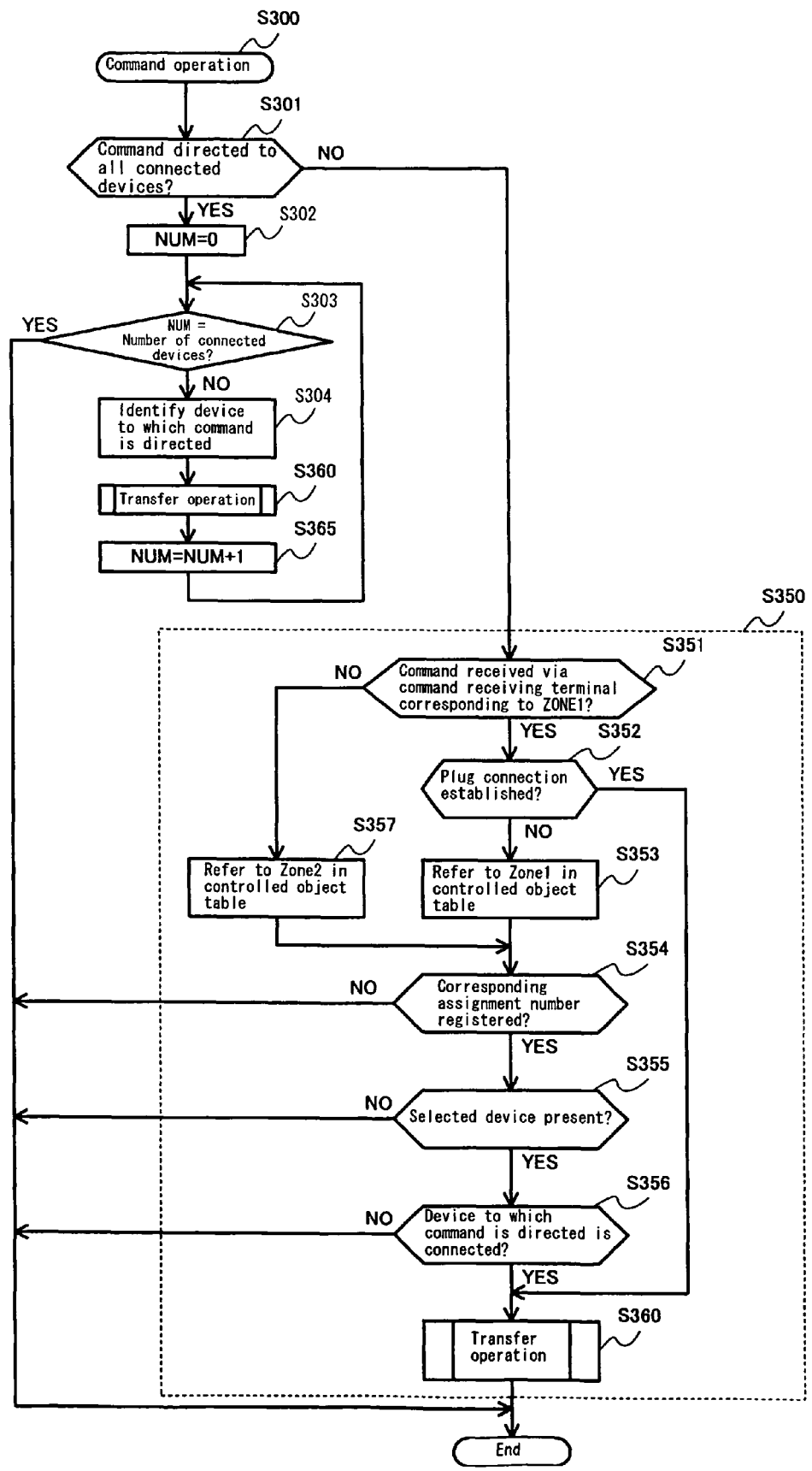
FIG. 6 is a flow chart showing in detail the operation of step S300 in FIG. 4.

Referring to FIG. 6, in the command operation (S300), the AV receiver 1 first determines whether or not the received reproduce command is a command directed to all of the connected devices on the IEEE1394 bus (S301). The AV receiver 1 makes this determination based on the command format. Since the reproduce command output from the remote controller RC1 is not a command directed to all of the connected devices, the AV receiver 1 performs a command object identification operation (S350).

The command object identification operation (S350) is an operation for identifying a content reproducing device AVP that is to be the object for the control command received by the AV receiver 1.

First, the AV receiver 1 refers to the device location table to determine whether or not the command receiving terminal via which the reproduce command has been received corresponds to the room Zone1 (S351). Since the command receiving terminal 161 receiving the reproduce command corresponds to room ID=Zone1, the process proceeds to step S352.

In step S352, the AV receiver 1 determines whether or not a plug connection has been established. Specifically, the AV receiver 1 determines whether or not the GUID of the content reproducing device AVP is registered in the plug connection table. In the plug connection table, the GUID of the DVD player AVP1 (="avp1") is registered. Therefore, the AV receiver 1 identifies the DVD player AVP1 as being the controlled object for the reproduce command.

After the controlled object is identified, the AV receiver 1 transmits a reproduce command. In this process, the AV receiver 1 performs a transfer operation for the reproduce command (S360).

In the transfer operation (S360), it is determined whether or not the controlled object is capable of handling the reproduce command. If not, the reproduce command is converted to an AV/C command. This is because any device that can be connected to the IEEE1394 bus is capable of handling an AV/C command.

Figure 7:
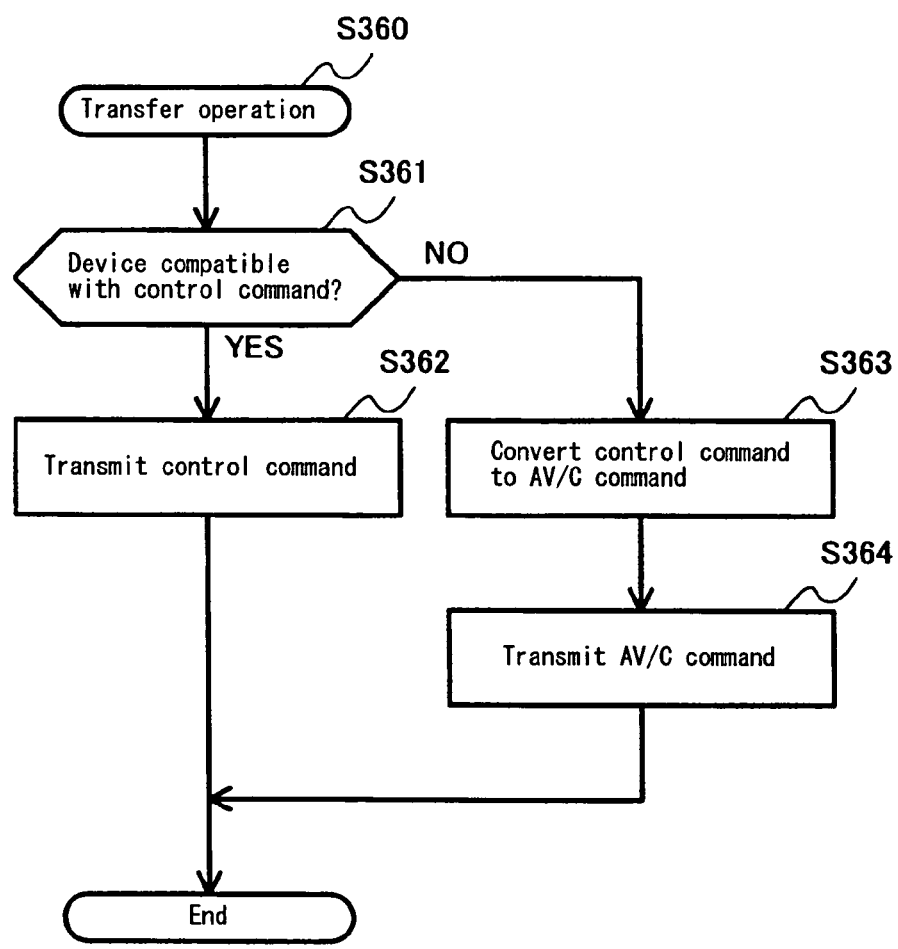
FIG. 7 is a flow chart showing in detail the operation of step S360 in FIG. 6.
Figure 8:
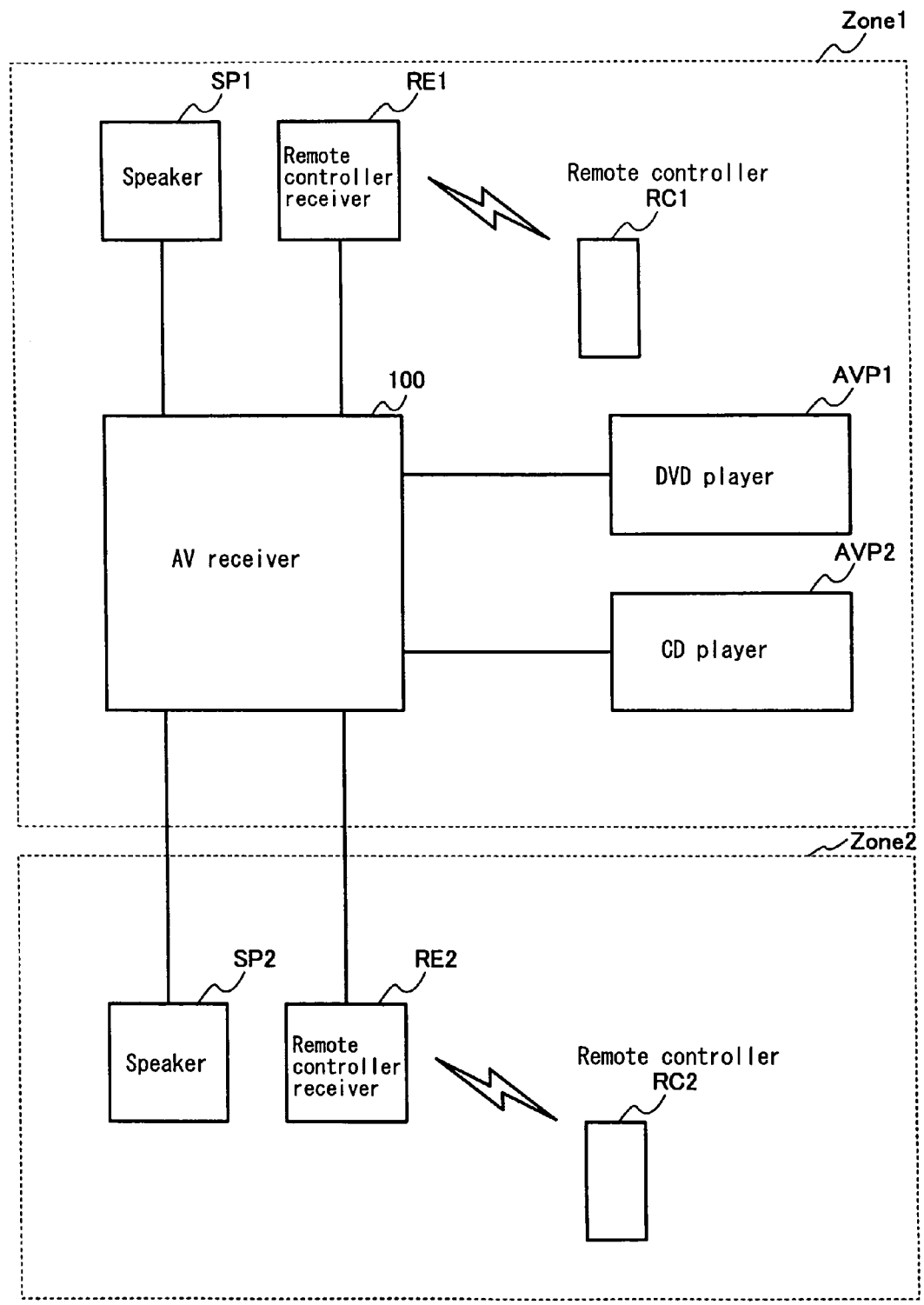
FIG. 8 is a functional block diagram showing how a conventional AV receiver, content reproducing devices, remote controller receivers and speakers are connected to one another.

Referring to FIG. 7, the AV receiver 1 determines whether or not the DVD player AVP1 can respond to the reproduce command (S361). If the reproduce command is an AV/C command or if the reproduce command is a vendor unique command that can be handled by the DVD player AVP1, the AV receiver 1 transmits the reproduce command as it is to the DVD player AVP1 (S362).

If it is determined in step S361 that the reproduce command is a vendor unique command that cannot be handled by the DVD player AVP1, the AV receiver 1 converts the reproduce command to an AV/C command (S363). In this process, the AV receiver 1 converts the reproduce command based on the command table shown in Table 7 below. The command table is stored in the memory 11.

TABLE 7

Command Table

| Vendor Unique Command | AV/C Command |
|---|---|
| BC1 | AVC1 |
| BC3 | AVC2 |
| ... | ... |

In the command table, AV/C commands are registered, each corresponding to one vendor unique command. Assuming that the reproduce command is a vendor unique command BC1, the AV receiver 1 converts the vendor unique command BC1 to an AV/C command AVC1. Then, the AV receiver 1 transmits the AV/C command AVC1 to the DVD player AVP1 (S364).

Through the operation described above, if the content reproducing device AVP cannot handle a control command, the AV receiver 1 transmits an AV/C command. Thus, the content reproducing device can operate in response to a transmitted control command. In other words, the AV receiver 1 can operate the content reproducing device AVP.

In step S363, if no AV/C command corresponding to the reproduce command is found in the command table, the AV receiver 1 does not transmit a command to the DVD player AVP1.

The DVD player AVP1 receives the reproduce command and outputs an isochronous data signal. The AV receiver 1 receives the isochronous data signal and converts it to an analog signal in the signal processing section 12. Based on the device location table, the AV receiver 1 outputs an analog signal from the speaker terminal 171 corresponding to the command receiving terminal 161 via which the reproduce command has been received. The speaker SP1 receives the analog signal to output sound.

Through the operation described above, the user in the room Zone1 can operate the DVD player AVP1.

2.3.1.2. Where Plug Connection is not Specified for Content Reproducing Device being Controlled Object The section 2.3.1.1. above is directed to the operation of the AV receiver 1 where a plug connection is specified for the content reproducing device being the controlled object.

If the value of the plug connection field corresponding to the DVD player AVP1 (GUID=avp1) in the assignment table is "0" as shown in Table 8 below, the command object identification operation (S350) will not be as described in the section 2.3.1.1. above.

TABLE 8

Assignment Table

| Assignment# | GUID | Plug Connection |
|---|---|---|
| AS1 | avp1 | 0 |
| AS2 | avp2 | 0 |
| ... | ... | ... |

Referring to FIG. 6, in step S352 in the command object identification operation (S350), the AV receiver 1 determines that a plug connection has not been established. In this operation, the AV receiver 1 refers to the record with room ID=Zone1 in the controlled object table (S353), and determines whether or not an assignment number corresponding to room ID=Zone1 is registered (S354). Assignment#=AS1 is registered in the controlled object table. Therefore, the AV receiver 1 determines that the DVD player AVP1 is being selected based on the GUID corresponding to AS1 in the assignment table (S355).

Then, the AV receiver 1 determines whether or not the DVD player AVP1 is actually connected to the AV receiver 1 (S356). When a content reproducing device AVP, which has been registered in the assignment table, is disconnected from the IEEE1394 bus 18, the AV receiver 1 does not update the assignment table. Therefore, there may be cases where a content reproducing device AVP registered in the assignment table is not actually connected to the AV receiver 1.

In view of this, the AV receiver 1 determines in step S356 whether or not the GUID corresponding to assignment#=AS1 exists in the connected device table. Since the connected device table is updated each time the topology of the IEEE1394 bus changes, it can be assumed that any content reproducing device AVP registered in the connected device table is actually connected to the AV receiver 1 (i.e., the connection has been maintained).

If GUID=avp1 corresponding to assignment#=AS1 is registered in the connected device table, it is determined that the DVD player AVP1 has maintained its connection with the AV receiver 1 (S356). Therefore, the AV receiver 1 performs the transfer operation (S360).

If GUID=avp1 corresponding to assignment#=AS1 is not registered in the connected device table, the process exits the command operation. Thus, the AV receiver 1 does not transmit an unnecessary command to the IEEE1394 bus 18. This is because if an unnecessary command is transmitted, it may cause another content reproducing device, which is not the controlled object, to malfunction.

The operation thereafter is as described in the section 2.3.1.1. above. Note however that when the AV receiver 1 receives an analog signal from the DVD player AVP1, the AV receiver 1 performs a signal processing operation such as an noise removing operation in the signal processing section 12, and then outputs the analog signal from the speaker terminal 171.

2.3.2. Control Operation Based on Operation by User in Room Zone2

The AV receiver 1 can simultaneously operate a plurality of content reproducing devices AVP based on a plurality of user operations. Therefore, while a user in the room Zone1 is operating the DVD player AVP1, another user in the room Zone 2 can operate the CD player AVP2. The control operation (S3) for controlling the AV receiver 1 based on a user operation by a user in the room Zone2 will now be described.

Based on a user operation, the remote controller RC2 transmits a select command to select the select button $B_{AS2}$ (i.e., assignment#=AS2).

The command receiving terminal 162 of the AV receiver 1 receives the select command via the remote controller receiver RE2 (S30). Then, the AV receiver 1 registers "AS2" in the assignment number field corresponding to Zone2 in the controlled object table as shown in Table 9 below (S31).

TABLE 9

Controlled Object Table

| Room ID | Assignment# |
|---------|-------------|
| Zone1   | AS1         |
| Zone2   | AS2         |

Since data is registered in the assignment number field corresponding to Zone2 (S31), a plug connection is not established. This is because the AV receiver 1 does not establish a plug connection with a content reproducing device AVP corresponding to Zone2.

When the user in the room Zone2 wishes to reproduce a music piece on the CD player AVP2, the user uses the remote controller RC2 to transmit a reproduce command to the remote controller receiver RE2. The command receiving terminal 162 receives the reproduce command via the remote controller receiver RE2 (S35). Then, the AV receiver 1 performs a command operation (S300).

In step S351 in the command operation (S300), the AV receiver 1 determines that the command receiving terminal 162 corresponds to Zone2. Therefore, the AV receiver 1 refers to a record of Zone2 in the controlled object table (S357). The operation thereafter is as described in the section 2.3.1.2. above.

Through the operation described above, the AV receiver 1 can operate the CD player AVP2 based on an operation by a user while operating the DVD player AVP1 based on an operation by another user. This is because it is possible to identify content reproducing devices AVP associated with different command receiving terminals.

2.3.3. Simultaneous Operation of all Content Reproducing Devices

The AV receiver 1 can simultaneously operate all of the content reproducing devices AVP connected to the IEEE1394 bus 18 in response to a single control command.

For example, when the user wishes to shut down all of the content reproducing devices AVP on the IEEE1394 bus 18 at once, the remote controller RC1 outputs a shutdown command based on a user operation.

The AV receiver 1 receiving a shutdown command (S35) performs the command operation (S300). In step S301 in the command operation, the AV receiver 1 determines that the shutdown command is a command directed to all of the connected devices (S301). Then, the counter value NUM is set to zero (S302), and it is determined whether or not the counter value NUM is equal to the number of connected devices obtained in the setting operation (S11) (S303). Since the number of connected devices is two (the DVD player AVP1 and the CD player AVP2), the AV receiver 1 identifies a content reproducing device AVP to which to transmit the shutdown command (S304). Specifically, the AV receiver 1 identifies the content reproducing device AVP, which was first registered in the connected device table. In the connected device table shown in Table 1 above, the AV receiver 1 identifies the DVD player AVP1. Then, the AV receiver 1 performs the transfer operation (S360), and transmits the shutdown command to the DVD player AVP1. Then, the AV receiver 1 increments the counter value NUM (S365), and returns to step S303. Thus, the shutdown command is transmitted to different content reproducing devices AVP in the order they have been registered in the connection table. If it is determined in step S303 that the counter value NUM is equal to the number of connected devices, the AV receiver 1 determines that the shutdown command has been transmitted to all of the content reproducing devices on the IEEE1394 bus 18. Thus, the AV receiver 1 exits the control operation.

Through the operation described above, the AV receiver 1 can simultaneously operate a plurality of content reproducing devices AVP in response to a single command. Note that whether or not a control command is directed to a plurality of content reproducing devices AVP is predetermined for each command.

While the user uses the remote controller RC to transmit a control command, or the like, to the AV receiver 1 in the present embodiment, the user may input a command directly to the AV receiver 1. For example, an input device such as a keyboard may be connected to the group of command receiving terminals 16. The input device may be provided in the AV receiver 1.

In the present embodiment, a content reproducing device corresponding to the room Zone1 can establish a plug connection while a content reproducing device corresponding to the room Zone2 cannot establish a plug connection. Alternatively, it may be allowed to establish a plug connection both in the room Zone1 and in the room Zone2.

While the present invention has been described above in a preferred embodiment, it is understood that the embodiment is merely illustrative of how the invention may be carried out, and it is apparent to those skilled in the art that variations and modifications thereof can be made without departing from the spirit and scope of the invention.

What is claimed is:

1. An amplifier, which can be connected to a plurality of content reproducing devices, the amplifier comprising:
   a plurality of command receiving sections, connectable to a respective remote controller receiver installed in a respective room, for receiving controlled object identified commands for selecting a content reproducing device that is a controlled object, and play commands for causing the selected content reproducing device to play an audio data;
   a plurality of audio receiving sections for receiving an audio data from the respective content reproducing devices;
   a plurality of audio output sections for outputting the audio data received from the respective content reproducing devices to a respective speaker installed in a respective room;
   a storing section for storing identified information of content reproducing devices connected to the amplifier while associating identified information of the command receiving sections and identified information of said audio output sections;
   a first registering section for registering identified information of content reproducing devices connected to the amplifier to the storing section;
   a second registering section for registering identified information of the content reproducing device selected based on the controlled object identified command among identified information of content reproducing devices registered in the storing section, to the storing section, while associating identified information of the command receiving section that has received the controlled object identified command and associating identified information of the audio output section associated with the command receiving section;
   an identification section for identifying the content reproducing device and the audio output section associated with the command receiving section that has received the play command, based on the storing section;

a command transmitting section for transmitting the play command to the identified content reproducing device; and an audio transmitting section for transmitting the audio data received from the respective identified content reproducing device from the respecitve identified audio output section to the respective speaker.

2. The amplifier according to claim 1, further comprising:

a plug connection determination section for determining whether or not a plug connection for isochronous data transfer has been established to the identified content reproducing device;

a connection determination section for, if the plug connection has not been established, determining whether or not a connection to the identified content reproducing device has been maintained;

the command transmitting section transmits the control command if the plug connection has been established or if the connection to the identified content reproducing device has been maintained.

3. The amplifier according to claim 1, wherein the amplifier can be connected to the plurality of content reproducing devices via an IEEE1394 bus, the amplifier further comprising:

a command storing section for storing an AV/C command corresponding to the control command;

a command determination section for determining whether or not the identified content reproducing device can operate based on the control command; and a search section for, if the command determination section determines that the identified content reproducing device cannot operate based on the control command, searching for the AV/C command corresponding to the control command from the command storing section, wherein if the search section finds the AV/C command, the command transmitting section transmits the AV/C command found by the search section.

4. The amplifier according to claim 1, further comprising a plurality of selector sections to which one or more content reproducing devices selected from among the plurality of content reproducing devices are assigned, wherein the selected object storing section includes:

an assignment storing section for storing each pair of a selector section and a content reproducing device assigned to the selector section while the selector section and the content reproducing device are associated with each other;

a device location storing section for storing each pair of a command receiving section and a room accommodating a remote control command receiving section connected to the command receiving section while the command receiving section and the room are associated with each other; and a controlled object storing section for storing each pair of a selector section and a room while the selector section and the room are associated with each other.

5. The amplifier according to claim 4, wherein the assignment storing section further stores data indicating whether or not a plug connection for isochronous data transfer is to be established.

6. The amplifier according to claim 4, wherein the selected object storing section further includes a plug connection storing section for, if a content reproducing device has established a plug connection for isochronous data transfer, storing the content reproducing device.

7. A computer program stored on a computer-readable storage medium for instructing a computer to perform an operation of an amplifier, which can be connected to a plurality of content reproducing devices and which includes:

a plurality of command receiving sections, connectable to a respective remote controller receiver installed in a respective room, for receiving controlled object identified commands for selecting a content reproducing device that is a controlled object, and play commands for causing the selected content reproducing device to play an audio data;

a plurality of audio receiving sections for receiving an audio data from the respective content reproducing devices; and a plurality of audio output sections for outputting the audio data received from the respective content reproducing devices to a respective speaker installed in a respective room, the computer program comprising:

a storing step of storing identified information of content reproducing devices connected to the amplifier while associating identified information of the command receiving sections and identified information of said audio output sections;

a first registering step of registering identified information of content reproducing devices connected to the amplifier to the storing section;

a second registering step of registering identified information of the content reproducing device selected based on the controlled object identified command among identified information of content reproducing devices registered in the storing section, to the storing section, while associating identified information of the command receiving section that has received the controlled object identified command and associating identified information of the audio output section associated with the command receiving section;

an identification step of identifying the content reproducing device and the audio output section associated with the command receiving section that has received the play command, based on what has been stored in the storing step;

a command transmitting step of transmitting the play command to the identified content reproducing device; and an audio transmitting step of transmitting the audio data received from the respective identified content reproducing device from the respecitve identified audio output section to the respective speaker.

8. The computer program according to claim 7, instructing the computer to further perform:

a plug connection determination step of determining whether or not a plug connection for isochronous data transfer has been established to the identified content reproducing device; and a connection determination step of, if the plug connection has not been established, determining whether or not a connection to the identified content reproducing device has been maintained, wherein the control command is transmitted in the command transmitting step if the plug connection has been established or if the connection to the identified content reproducing device has been maintained.

9. The computer program according to claim 7, wherein the amplifier can be connected to the plurality of content reproducing devices via an IEEE1394 bus and further includes a command storing section for storing an AV/C command cor responding to the control command, the computer program instructing the computer to further perform:

a command determination step of determining whether or not the identified content reproducing device can operate based on the control command; and a search step of, if it is determined in the command determination step that the identified content reproducing device cannot operate based on the control command, searching for the AV/C command corresponding to the control command from the command storing section, wherein if the AV/C command is found in the search step, the AV/C command found in the search step is transmitted in the command transmitting step.

10. The computer program according to claim 7, wherein the amplifier further includes a plurality of selector sections to which one or more content reproducing devices selected from among the plurality of content reproducing devices are assigned, wherein the selected object storing step includes:

an assignment storing step of storing each pair of a selector section and a content reproducing device assigned to the selector section while the selector section and the content reproducing device are associated with each other;

a device location storing step of storing each pair of a command receiving section and a room accommodating a remote control command receiving section connected to the command receiving section while the command receiving section and the room are associated with each other; and a controlled object storing step of storing each pair of a selector section and a room while the selector section and the room are associated with each other.

11. The computer program according to claim 10, wherein data indicating whether or not a plug connection for isochronous data transfer is to be established is further stored in the assignment storing step.

12. The computer program according to claim 10, wherein the selected object storing step further includes a plug connection storing step of, if a content reproducing device has established a plug connection for isochronous data transfer, storing the content reproducing device.

* * * * *